(12) United States Patent
Bhatoolaul et al.

(10) Patent No.: US 12,389,396 B2
(45) Date of Patent: Aug. 12, 2025

(54) SYSTEM INFORMATION ACQUISITION METHOD FOR REDUCED CAPABILITY NR DEVICES

(71) Applicant: Nokia Technologies Oy, Espoo (FI)

(72) Inventors: David Bhatoolaul, Swindon (GB); Rapeepat Ratasuk, Inverness, IL (US); Nitin Mangalvedhe, Hoffman Estates, IL (US); Karol Schober, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 465 days.

(21) Appl. No.: 17/998,070

(22) PCT Filed: Apr. 22, 2021

(86) PCT No.: PCT/IB2021/053336
§ 371 (c)(1),
(2) Date: Nov. 7, 2022

(87) PCT Pub. No.: WO2021/229329
PCT Pub. Date: Nov. 18, 2021

(65) Prior Publication Data
US 2023/0180235 A1     Jun. 8, 2023

Related U.S. Application Data

(60) Provisional application No. 63/025,284, filed on May 15, 2020.

(51) Int. Cl.
*H04W 72/1273*     (2023.01)
*H04L 5/00*     (2006.01)
*H04W 72/23*     (2023.01)

(52) U.S. Cl.
CPC ....... *H04W 72/1273* (2013.01); *H04L 5/0053* (2013.01); *H04W 72/23* (2023.01)

(58) Field of Classification Search
CPC . H04W 72/1273; H04W 72/23; H04W 72/20; H04L 5/0053
See application file for complete search history.

(56) References Cited

U.S. PATENT DOCUMENTS

| | | | |
|---|---|---|---|
| 2023/0043517 A1* | 2/2023 | Höglund | H04W 74/0841 |
| 2023/0156752 A1* | 5/2023 | Tuong Tran | H04W 72/1273 |
| | | | 370/329 |

(Continued)

FOREIGN PATENT DOCUMENTS

| | | |
|---|---|---|
| JP | 2017-510224 A | 4/2017 |
| WO | 2015/143244 A1 | 9/2015 |

(Continued)

OTHER PUBLICATIONS

Office Action received for corresponding Japanese Patent Application No. 2022-569473, dated Dec. 12, 2023, 3 pages of Office Action and 4 pages of summary and translation available.

(Continued)

*Primary Examiner* — Walli Z Butt
(74) *Attorney, Agent, or Firm* — Barta Jones, PLLC

(57) ABSTRACT

A system, apparatus, method, and non-transitory computer readable medium for system information acquisition for reduced capability NR devices may include a UE device which is caused to, determine a plurality of physical downlink control channel (PDCCH) candidates from a control resource set (CORESET), monitor a PDCCH from the plurality of PDCCH candidates, determine reduced capability (REDCAP) scheduling information from a downlink control information (DCI) received on the PDCCH, and receive REDCAP system information based on the determined REDCAP scheduling information.

7 Claims, 6 Drawing Sheets

(56) References Cited

U.S. PATENT DOCUMENTS

2023/0164781 A1* 5/2023 Kim .............. H04W 48/12
                                                370/329
2023/0180110 A1* 6/2023 Kim .............. H04W 48/02
                                                370/329

FOREIGN PATENT DOCUMENTS

WO    2019/160498 A1    8/2019
WO    2020/032643 A1    2/2020

OTHER PUBLICATIONS

"L1 enhancement on PDCCH for URLLC", 3GPP TSG RAN WG1 Meeting #95, R1-1812742, Agenda Item: 7.2.6.1.1, Sony, Nov. 12-16, 2018, 5 pages.

"New SID on support of reduced capability NR devices", 3GPP TSG RAN Meeting #86, RP-193238, Agenda: 9.1.1, Ericsson, Dec. 9-12, 2019, 5 pages.

"3rd Generation Partnership Project; Technical Specification Group Radio Access Network; NR; Physical layer procedures for control (Release 16)", 3GPP TS 38.213, V16.0.0, Dec. 2019, pp. 1-146.

International Search Report and Written Opinion received for corresponding Patent Cooperation Treaty Application No. PCT/IB2021/053336, dated Aug. 12, 2021, 11 pages.

"DL Control for URLLC", 3GPP TSG RAN WG1 #99, R1-1912472, Agenda: 7.2.6.1, Samsung, Nov. 18-22, 2019, pp. 1-5.

"Potential UE complexity reduction features", 3GPP TSG RAN WG1 #100 bis, R1-2003307, Agenda: 8.3.1, China Unicom, May 25-Jun. 5, 2020, 3 pages.

Office action received for corresponding European Patent Application No. 21722299.1, dated Jan. 12, 2023, 6 pages.

Office action received for corresponding Indian Patent Application No. 202247071538, dated Feb. 1, 2023, 6 pages.

Notice of Allowance received for corresponding European Patent Application No. 21722299.1, dated Oct. 23, 2024, 8 pages.

* cited by examiner

SYSTEM INFORMATION ACQUISITION METHOD FOR REDUCED CAPABILITY NR DEVICES

RELATED APPLICATION

This application was originally filed as PCT Application No. PCT/IB2021/053336 on Apr. 22, 2021, which claims priority to U.S. Provisional Application No. 63/025,284, filed on May 15, 2020, each of which is incorporated herein by reference in its entirety.

BACKGROUND

Field

Various example embodiments relate to methods, apparatuses, systems, and/or non-transitory computer readable media for system information block type 1 (SIB1) acquisition for reduced capability user equipment devices.

Description of the Related Art

Currently, a $5^{th}$ generation mobile network (5G) standard, referred to as 5G New Radio (NR), is being developed to provide higher capacity, higher reliability, and lower latency communications than the 4G long term evolution (LTE) standard. One of the expected goals of the 5G standard is to provide these communication capabilities to new types of user equipment (UE) devices with reduced capabilities (e.g., reduced number of radio antennas, reduced processing time, reduced processing capabilities, etc.), lower on-device resources (e.g., reduced memory storage space, reduced battery capacity, etc.), less expensive devices, physically smaller devices (e.g., small form factors, etc.), completely wireless devices (e.g., devices that are expected to operate without human intervention for extended periods of time), etc. These new types of UE devices may be referred to as NR-Light and/or reduced capability (REDCAP) devices. Some possible use cases for NR-Light and/or REDCAP devices include, for example, consumer Internet of Things (IoT) devices, massive industrial networks, smart city infrastructure, wearable devices, networked medical devices, autonomous devices, etc. These types of UE devices may operate for extended periods of time without human intervention (e.g., the UE devices may operate without routine maintenance being performed, such as the replacement or recharging of an on-device battery, etc.), may have reduced processing power, may have reduced number of radio antennas and/or may be configured to use less bandwidth, may have reduced battery storage capability due to having small form factors, may be integrated into machinery (e.g., heavy machinery, factory machinery, sealed devices, etc.), may be installed/located in hazardous environment or difficult to access environments, etc.

Therefore, it is desired goal of the 5G standard to provide these types of UE devices with an ability to determine whether a particular cell of a wireless network supports services which the NR-Light and/or REDCAP UE device desires and/or allow access to the wireless network, while using less power and/or requiring less computational complexity over conventional techniques.

However, the current 5G standard defines a single protocol for UE devices to acquire system information used to determine the services available on one or more cells of a 5G wireless network and/or access the 5G wireless network, irrespective of whether the UE device is a standard UE device (e.g., a legacy UE device, etc.), or a NR-Light and/or REDCAP UE device.

Accordingly, an approach is desired that provides a method for acquiring system information to a wireless network for acquiring REDCAP-specific system information from a cell of the wireless network that consumes less power and/or requires reduced computation complexity than conventional system information acquisition techniques.

SUMMARY

At least one example embodiment relates to a user equipment (UE) device including a memory storing computer readable instructions, and processing circuitry configured to execute the computer readable instructions.

In at least one example embodiment, the UE device is caused to: determine a plurality of physical downlink control channel (PDCCH) candidates from a control resource set (CORESET), monitor a PDCCH from the plurality of PDCCH candidates, determine reduced capability (REDCAP) scheduling information from a downlink control information (DCI) received on the PDCCH, and receive REDCAP system information based on the determined REDCAP scheduling information.

Some example embodiments provide that the CORESET is an extended CORESET, and the extended CORESET includes one or more of legacy control resources and one or more extended control resources.

Some example embodiments provide that the UE device is further caused to determine whether a radio access network (RAN) node supports the extended CORESET.

Some example embodiments provide that the UE device is further caused to determine whether the RAN node supports the extended CORESET by: receiving a master information block (MIB) from the RAN node, determining whether the MIB includes REDCAP support information, and determining whether the RAN node supports the extended CORESET based on results of the determining whether the MIB includes the REDCAP support information.

Some example embodiments provide that the UE device is further caused to determine whether the RAN node supports the extended CORESET by: blindly monitoring a search space associated with the extended CORESET for the plurality of PDCCH candidates, and determining whether the RAN node supports the extended CORESET based on successfully receiving the DCI on the PDCCH.

Some example embodiments provide that the DCI includes scheduling information corresponding to a legacy system information block type 1 (SIB1) and scheduling information corresponding to a REDCAP SIB1.

Some example embodiments provide that the DCI is scrambled using a REDCAP-specific radio network temporary identifier (RNTI), and the DCI includes scheduling information corresponding to REDCAP SIB1.

Some example embodiments provide that the plurality of PDCCH candidates include control channel elements (CCEs) from the one or more of legacy control resources and the one or more extended control resources.

Some example embodiments provide that the one or more of legacy control resources and the one or more of extended control resources are contiguous in a time domain or a frequency domain.

Some example embodiments provide that the one or more of legacy control resources and the one or more extended control resources are in different slots.

Some example embodiments provide that the plurality of PDCCH candidates include CCEs from the extended control resources.

Some example embodiments provide that the extended CORESET includes joint control resources, the joint control resources include the extended control resources appended to the legacy control resources, and the plurality of PDCCH candidates are mapped to the joint control resources of the extended CORESET using a hash function.

Some example embodiments provide that the UE device is further caused to: receive a modified legacy SIB1 message, the modified legacy SIB1 message including legacy system information and the REDCAP system information.

Some example embodiments provide that the UE device is further caused to: receive a REDCAP-specific SIB1 message, the REDCAP-specific SIB1 message including the REDCAP system information.

At least one example embodiment relates to a user equipment (UE) device including a memory storing computer readable instructions, and processing circuitry configured to execute the computer readable instructions.

In at least one example embodiment, the UE device is caused to: determine whether a radio access network (RAN) node supports an extended control resource set (CORESET), determine a plurality of physical downlink control channel (PDCCH) candidates from the CORESET based on results of the determining whether the RAN node supports the extended CORESET, monitor a PDCCH from the plurality of PDCCH candidates, and decode downlink control information (DCI) received on the monitored PDCCH.

Some example embodiments provide that the UE device is further caused to: determine reduced capability (REDCAP) scheduling information from the decoded DCI, and receive REDCAP system information from the RAN node based on the determined REDCAP scheduling information.

Some example embodiments provide that the UE device is further caused to receive a REDCAP system information block type 1 (SIB1) message, the REDCAP SIB1 message including the REDCAP system information.

Some example embodiments provide that the DCI is scrambled using a REDCAP-specific radio network temporary identifier (RNTI), and the DCI includes scheduling information corresponding to a REDCAP SIB1.

Some example embodiments provide that the plurality of PDCCH candidates include control channel elements (CCEs) from one or more of legacy control resources and one or more extended control resources.

Some example embodiments provide that the one or more legacy control resources and the one or more extended control resources are contiguous in a time domain or a frequency domain.

Some example embodiments provide that the one or more of legacy control resources and the one or more extended control resources are in different slots.

At least one example embodiment relates to a method of operating a user equipment (UE) device.

In at least one example embodiment, the method includes: determining, using processing circuitry, a plurality of physical downlink control channel (PDCCH) candidates from a control resource set (CORESET), monitoring, using the processing circuitry, a PDCCH from the plurality of candidate PDCCHs, determining, using the processing circuitry, reduced capability (REDCAP) scheduling information from a downlink control information (DCI) received on the PDCCH, and receiving, using the processing circuitry, REDCAP system information based on the determined REDCAP scheduling information.

Some example embodiments provide that the CORESET is an extended CORESET, and the extended CORESET includes one or more of legacy control resources and one or more extended control resources.

Some example embodiments provide that the method further includes determining, using the processing circuitry, whether a radio access network (RAN) node supports the extended CORESET.

Some example embodiments provide that the determining whether the RAN node supports the extended CORESET includes: receiving a master information block (MIB) from the RAN node, determining whether the MIB includes REDCAP support information, and determining whether the RAN node supports the extended CORESET based on results of the determining whether the MIB includes the REDCAP support information.

Some example embodiments provide that the determining whether the RAN node supports the extended CORESET includes: blindly monitoring a search space associated with the extended CORESET for the plurality of PDCCH candidates, and determining whether the RAN node supports the extended CORESET based on successfully receiving the DCI on the PDCCH.

At least one example embodiment relates to a user equipment (UE) device.

In at least one example embodiment, the UE device includes means for: determining a plurality of physical downlink control channel (PDCCH) candidates from a control resource set (CORESET), monitoring a PDCCH from the plurality of PDCCH candidates, determining reduced capability (REDCAP) scheduling information from a downlink control information (DCI) received on the PDCCH, and receiving REDCAP system information based on the determined REDCAP scheduling information.

Some example embodiments provide that the CORESET is an extended CORESET, and the extended CORESET includes one or more of legacy control resources and one or more extended control resources.

Some example embodiments provide that the UE device further includes means for determining whether a radio access network (RAN) node supports the extended CORESET.

Some example embodiments provide that the UE device further includes means for determining whether the RAN node supports the extended CORESET to: receive a master information block (MIB) from the RAN node, determine whether the MIB includes REDCAP support information, and determine whether the RAN node supports the extended CORESET based on results of the determining whether the MIB includes the REDCAP support information.

Some example embodiments provide that the UE device further includes means for determining whether the RAN node supports the extended CORESET to: blindly monitor a search space associated with the extended CORESET for the plurality of PDCCH candidates, and determine whether the RAN node supports the extended CORESET based on successfully receiving the DCI on the PDCCH.

Some example embodiments provide that the DCI includes scheduling information corresponding to a legacy system information block type 1 (SIB1) and scheduling information corresponding to a REDCAP SIB1.

Some example embodiments provide that the DCI is scrambled using a REDCAP-specific radio network temporary identifier (RNTI), and the DCI includes scheduling information corresponding to REDCAP SIB1.

Some example embodiments provide that the plurality of PDCCH candidates include control channel elements (CCEs) from the one or more of legacy control resources and the one or more extended control resources.

Some example embodiments provide that the one or more of legacy control resources and the one or more of extended control resources are contiguous in a time domain or a frequency domain.

Some example embodiments provide that the one or more of legacy control resources and the one or more extended control resources are in different slots.

Some example embodiments provide that the plurality of PDCCH candidates include CCEs from the extended control resources.

Some example embodiments provide that the extended CORESET includes joint control resources, the joint control resources include the extended control resources appended to the legacy control resources, and the plurality of PDCCH candidates are mapped to the joint control resources of the extended CORESET using a hash function.

Some example embodiments provide that the UE device further includes means for: receiving a modified legacy SIB1 message, the modified legacy SIB1 message including legacy system information and the REDCAP system information.

Some example embodiments provide that the UE device further includes means for: receiving a REDCAP-specific SIB1 message, the REDCAP-specific SIB1 message including the REDCAP system information.

At least one example embodiment relates to a user equipment (UE) device.

In at least one example embodiment, the UE device includes means for: determining whether a radio access network (RAN) node supports an extended control resource set (CORESET), determining a plurality of physical downlink control channel (PDCCH) candidates from the CORESET based on results of the determining whether the RAN node supports the extended CORESET, monitor a PDCCH from the plurality of PDCCH candidates, and decoding downlink control information (DCI) received on the monitored PDCCH.

Some example embodiments provide that the UE device further includes means for: determining reduced capability (REDCAP) scheduling information from the decoded DCI, and receiving REDCAP system information from the RAN node based on the determined REDCAP scheduling information.

Some example embodiments provide that the UE device further includes means for receiving a REDCAP system information block type 1 (SIB1) message, the REDCAP SIB1 message including the REDCAP system information.

Some example embodiments provide that the DCI is scrambled using a REDCAP-specific radio network temporary identifier (RNTI), and the DCI includes scheduling information corresponding to a REDCAP SIB1.

Some example embodiments provide that the plurality of PDCCH candidates include control channel elements (CCEs) from one or more of legacy control resources and one or more extended control resources.

Some example embodiments provide that the one or more legacy control resources and the one or more extended control resources are contiguous in a time domain or a frequency domain.

Some example embodiments provide that the one or more of legacy control resources and the one or more extended control resources are in different slots.

BRIEF DESCRIPTION OF THE DRAWINGS

The accompanying drawings, which are incorporated in and constitute a part of the specification, illustrate one or more example embodiments and, together with the description, explain these example embodiments. In the drawings.

DETAILED DESCRIPTION

Figure 1:
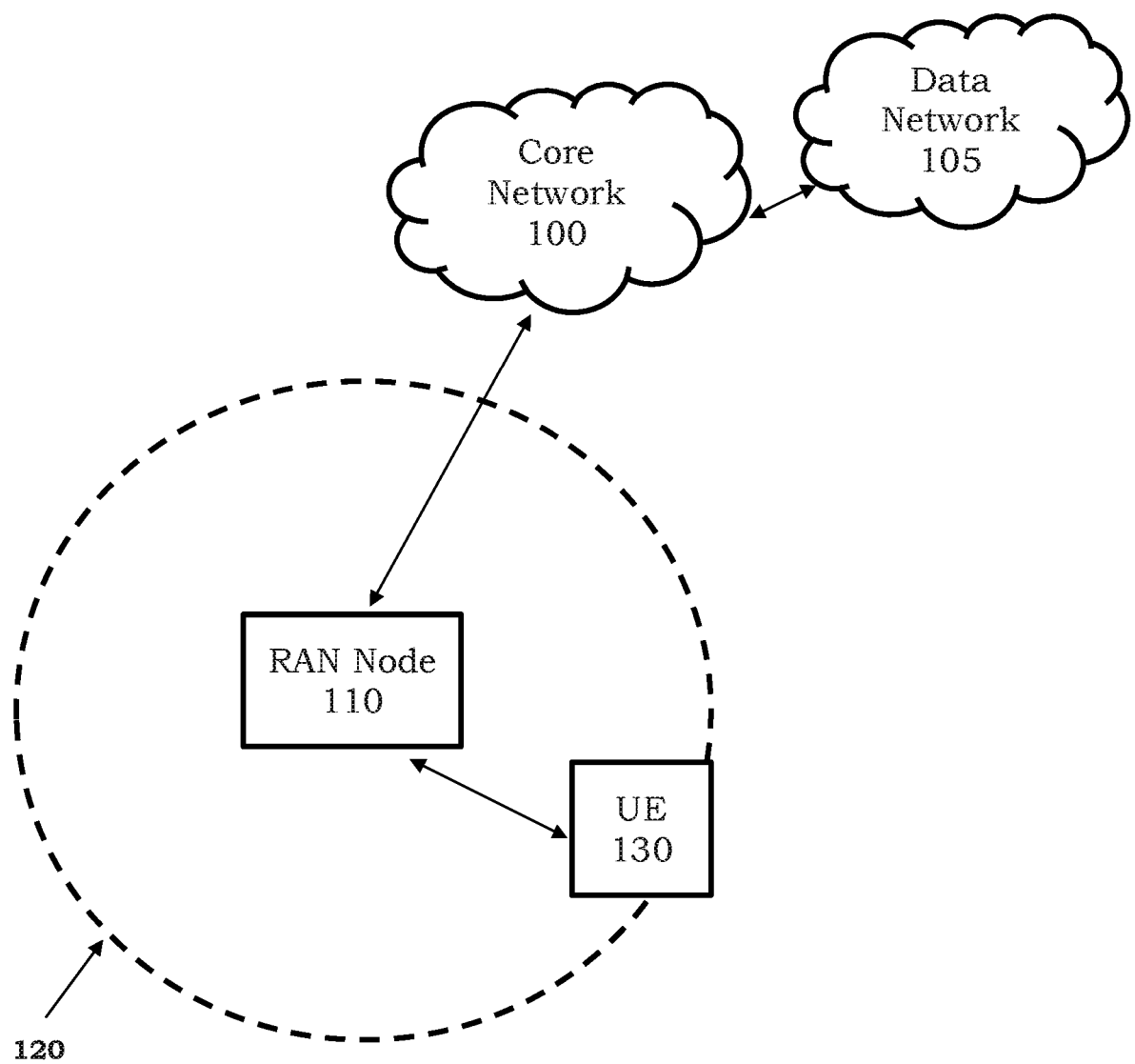
FIG. 1 illustrates a wireless communication system according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, may be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone or server, to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

At least one example embodiment refers to methods for acquiring reduced capability specific system information by reduced capability UE devices. While the various example embodiments of the present disclosure are discussed in connection with the 5G wireless communication standard for the sake of clarity and convenience, the example embodiments are not limited thereto, and one of ordinary skill in the art would recognize the example embodiments may be applicable to other wireless communication standards, such as the 4G standard, a Wi-Fi standard, a future 6G standard, a future 7G standard, etc.

FIG. 1 illustrates a wireless communication system according to at least one example embodiment. As shown in FIG. 1, a wireless communication system includes a core network 100, and a Data Network 105, at least one radio access network (RAN) node 110, a cell service area 120 corresponding to the RAN node 110, and at least one user equipment (UE) device (UEs or UE devices) 130 operating within the cell coverage area 120, but the example embodiments are not limited thereto and the example embodiments may include a greater or lesser number of constituent elements. For example, the wireless communication system may include a plurality of UE devices, a plurality of RAN nodes, etc.

The RAN node 110 and/or the UE device 130 may be connected over a wireless network, such as a cellular wireless access network (e.g., a 3G wireless access network, a 4G-Long Term Evolution (LTE) network, a 5G-New Radio (e.g., 5G) wireless network, a 6G network, a 7G network, a WiFi network, etc.). The wireless network may include a core network 100 and/or a Data Network 105. The RAN node 110 may connect to other RAN nodes (not shown), as well as to the core network 100 and/or the Data Network 105, over a wired and/or wireless network. The core network 100 and the Data Network 105 may connect to each other over a wired and/or wireless network. The Data Network 105 may refer to the Internet, an intranet, a wide area network, etc.

The UE device 130 may be a device having reduced processing capabilities, limited battery life, reduced form factor, etc., and may be a reduced capability (REDCAP) and/or a NR-Light device, but the example embodiments are not limited thereto. For example, the UE device 130 may be legacy UE device (e.g., a UE device with full capabilities, etc.) but may be configured to operate in accordance with the REDCAP-specific methods discussed herein to achieve the benefits of lower power consumption, reduced computational resource usage for decoding system information, and/or reduced network usage, etc., provided by the example embodiments. According to at least one example embodiment, the UE device 130 may be any one of, but not limited to, a mobile device, a tablet, a laptop computer, a wearable device, an Internet of Things (IoT) device, a sensor (e.g., thermometers, humidity sensors, pressure sensors, motion sensors, accelerometers, etc.), actuators, robotic devices, robotics, drones, connected medical devices, eHealth devices, smart city related devices, a security camera, autonomous devices (e.g., autonomous cars, etc.), a desktop computer and/or any other type of stationary or portable device capable of operating according to the 5G NR communication standard, and/or other wireless communication standard.

The wireless communication system further includes at least one RAN node (e.g., a base station, a wireless access point, etc.), such as RAN node 110, etc. The RAN node 110 may operate according to an underlying cellular and/or wireless radio access technology (RAT), such as 5G NR, LTE, etc. For example, the RAN node 110 may be a 5G gNB node, a LTE eNB node, or a LTE ng-eNB node, etc., but the example embodiments are not limited thereto. The RAN node 110 may provide wireless network services to one or more UE devices within a cell service area (e.g., a broadcast area, a serving area, a coverage area, etc.) surrounding the physical location of the RAN node, such as a cell service area 120 surrounding the RAN node 110, etc. For example, UE device 130 is located within the cell service area 120, and may connect to, receive broadcast messages from, receive paging messages from, receive/transmit signaling messages from/to, and/or access the wireless network through, etc., RAN node 110, but the example embodiments are not limited thereto.

Additionally, the RAN node and/or the corresponding cell servicing area may be referred to as a cell of the wireless network, and the wireless network may be segmented and/or defined as comprising one or more system areas including one or more cells.

The RAN node 110 may be connected to at least one core network element (not shown) residing on the core network 100, such as a core network device, a core network server, access points, switches, routers, nodes, etc., but the example embodiments are not limited thereto. The core network 100 may provide network functions, such as an access and mobility management function (AMF), a session management function (SMF), a policy control function (PCF), a unified data management (UDM), a user plane function (UPF), an authentication server function (AUSF), an application function (AF), and/or a network slice selection function (NSSF), etc., but the example embodiments are not limited thereto.

While certain components of a wireless communication network are shown as part of the wireless communication system of FIG. 1, the example embodiments are not limited thereto, and the wireless communication network may include components other than that shown in FIG. 1, which are desired, necessary, and/or beneficial for operation of the underlying networks within the wireless communication system 100, such as access points, switches, routers, nodes, servers, gateways, etc.

Figure 2:
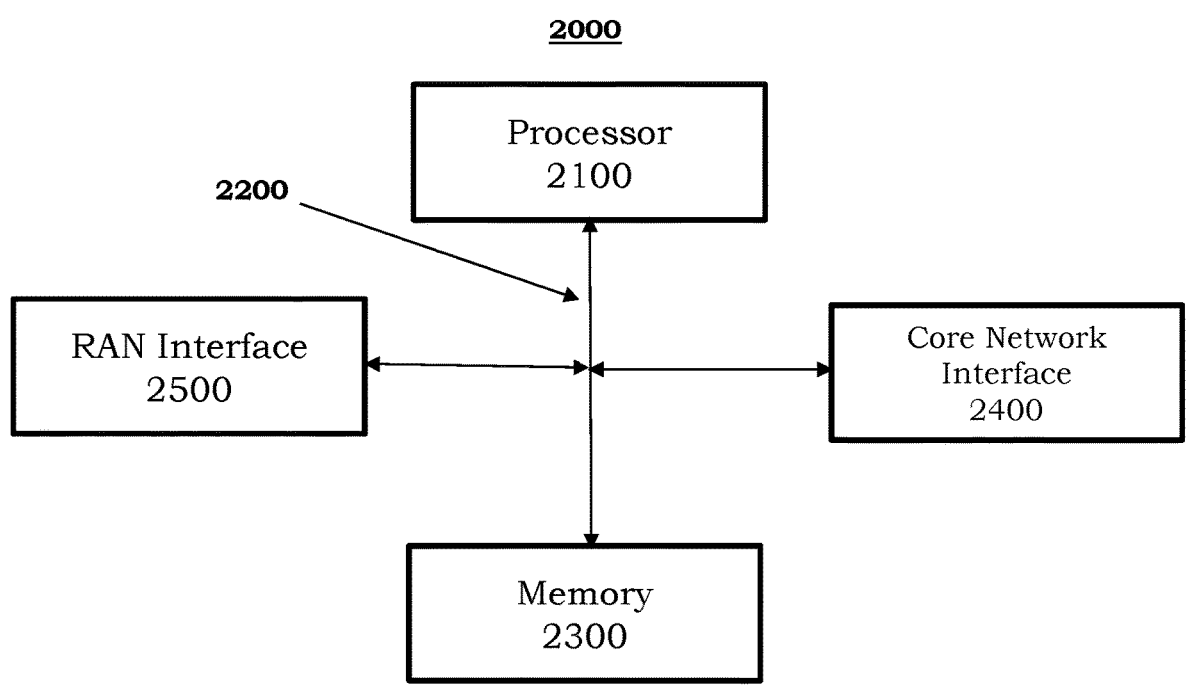
FIG. 2 illustrates a block diagram of an example RAN node according to at least one example embodiment.

FIG. 2 illustrates a block diagram of an example RAN node according to at least one example embodiment. The RAN node 2000 of FIG. 2 may correspond to the RAN node 110 of FIG. 1, but the example embodiments are not limited thereto.

Referring to FIG. 2, a RAN node 2000 may include processing circuitry, such as the at least one processor 2100, a communication bus 2200, a memory 2300, at least one core network interface 2400, and/or at least one radio access network (RAN) interface 2500, but the example embodiments are not limited thereto. For example, the core network interface 2400 and the RAN interface 2500 may be combined into a single network interface, etc., or the RAN node 2000 may include a plurality of RAN interfaces, a plurality of core network interfaces, etc., and/or combinations thereof. The memory 2300 may include various special purpose program code including computer executable instructions which may cause the RAN node 2000 to perform the one or more of the methods of the example embodiments.

In at least one example embodiment, the processing circuitry may include at least one processor (and/or processor cores, distributed processors, networked processors, etc.), such as the at least one processor 2100, which may be configured to control one or more elements of the RAN node 2000, and thereby cause the RAN node 2000 to perform various operations. The processing circuitry (e.g., the at least one processor 2100, etc.) is configured to execute processes by retrieving program code (e.g., computer readable instructions) and data from the memory 2300 to process them, thereby executing special purpose control and functions of the entire RAN node 2000. Once the special purpose program instructions are loaded into, (e.g., the at least one processor 2100, etc.), the at least one processor 2100 executes the special purpose program instructions, thereby transforming the at least one processor 2100 into a special purpose processor.

In at least one example embodiment, the memory 2300 may be a non-transitory computer-readable storage medium and may include a random access memory (RAM), a read only memory (ROM), and/or a permanent mass storage device such as a disk drive, or a solid state drive. Stored in the memory 2300 is program code (i.e., computer readable instructions) related to operating the RAN node 2000, such as the methods discussed in connection with FIGS. 4 to 7, the at least one core network interface 2400, and/or at least one RAN interface 2500, etc. Such software elements may be loaded from a non-transitory computer-readable storage medium independent of the memory 2300, using a drive mechanism (not shown) connected to the RAN node 2000, or via the at least one core network interface 2400, and/or at least one RAN interface 2500, etc.

In at least one example embodiment, the communication bus 2200 may enable communication and data transmission to be performed between elements of the RAN node 2000. The bus 2200 may be implemented using a high-speed serial bus, a parallel bus, and/or any other appropriate communication technology. According to some example embodiments, the RAN node 2000 may include a plurality of communication buses (not shown).

The RAN node 2000 may operate as, for example, a 4G RAN node, a 5G RAN node, a 6G RAN node, a 7G RAN node, etc., and may be configured to schedule resource blocks for UE devices connected to the RAN node 2000.

For example, the RAN node 2000 may allocate time-frequency resources of a carrier (e.g., resource blocks with time and frequency dimensions) based on operation on the time domain (e.g., time division duplexing) and the frequency domain (e.g., frequency division duplexing). In the time domain context, the RAN node 2000 will allocate a carrier (or subbands of the carrier) to one or more UEs (e.g., UEs 130, etc.) connected to the RAN node 2000 during designated upload (e.g., uplink) time periods and designated download (e.g., downlink) time periods. When there are multiple UEs connected to the RAN node 2000, the carrier is shared in time such that each UE is scheduled by the RAN node 2000, and the RAN node 2000 allocates each UE with their own uplink time and/or downlink time. In the frequency domain context, the RAN node 2000 will allocate separate frequency subbands of the carrier to UEs simultaneously served by the RAN node 2000, for uplink and/or downlink transmissions. Data transmission between the UE and the RAN node 2000 may occur on a radio frame basis in both the time domain and frequency domain contexts. The minimum resource unit for allocation and/or assignment by the RAN node 2000 to a particular UE device, i.e. a resource block, corresponds to a specific downlink/uplink time slot (e.g., one OFDM symbol, one slot, one subframe, etc.) and/or a specific downlink/uplink frequency subband (e.g., twelve adjacent subcarriers, etc.).

For the sake of clarity and consistency, the example embodiments will be described as using the time domain, but the example embodiments are not limited thereto and the example embodiments may operate in the frequency domain.

Additionally, according to at least one example embodiment, the RAN node 2000 may transmit system information to the one or more UE devices located within the cell servicing area of the RAN node 2000, which may be used by the one or more UE devices to access the wireless network. For example, the RAN node 2000 may periodically broadcast a synchronization signal block (SSB), physical broadcast channel (PBCH) block, and a master information block (MIB) to the one or more UE devices located within the corresponding cell servicing area, e.g., cell servicing area 120. The SSB, PBCH, and MIB blocks may include information regarding system parameters for use in cell discovery, establish frame synchronization, information used to enable reception of system information, etc. The UE device may then use the information included in the SSB, PBCH, and/or MIB to identify the subcarrier spacing used by the RAN node 2000 for various control and/or data channels, such as information related to a physical downlink control channel (PDCCH), information related to a physical uplink control channel (PUCCH), information related to a physical downlink shared channel (PDSCH), etc.

Additionally, the MIB may include information defining a "search space 0" to be monitored by the UE device to determine monitoring occasions for the PDCCH, such as PDCCH scheduling SIB1, as well as information indicating an initial control resource set (CORESET), e.g., "CORESET 0", which is a set of resources associated with at least search index 0 to be used to decode a downlink control information (DCI) transmitted to the UE device via the PDCCH.

The DCI may include information regarding frequency-domain resources and/or time-domain resources (e.g., resource block units) allocated to the UE device for data channel scheduling, modulation and coding schemes, etc. More specifically, the DCI (e.g., SIB1 DCI, a DCI with format 1_0, etc.) may include information related to the scheduling of transmission of system information blocks (SIBs), including the scheduling of an initial SIB type 1 (SIB1), and/or the scheduling of subsequent SIBs (e.g., SIB2, SIB3, SIB4, etc.). The SIBs may include information that is used by the UE device to access the wireless network, including system information, network parameters, etc.

However, the use of legacy SIBs, including legacy SIB1, may be inefficient when used with and/or incompatible with REDCAP UE devices. For example, the legacy SIB1 may be relatively large, and therefore REDCAP UE devices with low processing power and/or low amounts of memory may have difficulty decoding the legacy SIB1 and/or may be unable to decode the SIB1 within the defined time constraints under the 5G RAT. Further, it may be beneficial and/or advantageous to transmit SIB1 to REDCAP UE devices more frequently, transmit SIB1 over a narrower bandwidth, use SIB1 with a higher code-rate, in comparison with legacy SIB1, etc.

Consequently, the RAN node 2000 may be configured to transmit a new REDCAP-specific SIB1 (e.g., a SIB1-REDCAP) for use by REDCAP UE devices at a different time and/or frequency than legacy SIB1. According to some example embodiments, the REDCAP-specific SIB1 may have a smaller data size than the legacy SIB1 and/or have a different SIB1 format than the legacy SIB1, and therefore a legacy UE device which is not configured to operate in REDCAP and/or NR-light mode may be unable to decode and/or use the REDCAP-specific SIB1. Moreover, according to some example embodiments, the REDCAP SIB1 scheduling information may be received based on a REDCAP-specific DCI which has been scrambled using a REDCAP-specific radio network temporary identifier (RNTI), which the legacy UE device may not decode, and therefore the legacy UE device may not receive the REDCAP-specific SIB1. Additionally, according to some example embodiments, the legacy SIB1 may be modified to include REDCAP relevant system information and scheduled with a legacy DCI, or a REDCAP-specific DCI, but the example embodiments are not limited thereto.

Additionally, in order to support the REDCAP-specific SIB1 and/or the modified SIB1, the RAN node 2000 may be configured to transmit a modified DCI (e.g., a modified legacy SIB1 DCI, etc.), which may be modified to support the scheduling of the new REDCAP-specific SIB1, and/or transmit a new REDCAP-specific DCI. Furthermore, the RAN node 2000 may be configured to transmit a modified CORESET (e.g., a modified legacy CORESET, an extended CORESET, a REDCAP-specific CORESET, etc.) including information related to a modified and/or expanded search space, in order to accommodate the REDCAP DCI. An extended CORESET may be comprised of two different CORESETs or may be comprised of one CORESET and an extension. For example, an extended CORESET may be comprised of a first CORESET and a second CORESET. In another example, an extended CORESET may be comprised of a first CORESET and an extension (i.e. additional time-frequency resource for control) of a first CORESET.

The REDCAP-specific system information transmission methods according to some example embodiments will be discussed in further detail in connection with FIGS. 4 to 7.

The RAN node 2000 may also include at least one core network interface 2400, and/or at least one RAN interface 2500, etc. The at least one RAN interface 2500 may include an associated radio unit (not shown) and may be used to transmit the wireless signals in accordance with a radio access technology, such as 4G LTE wireless signals, 5G NR wireless signals, 6G wireless signals, 7G wireless signals, etc., to at least one UE device, such as UE 130, etc. According to some example embodiments, the RAN interface 2500 may be a single antenna, or may be a plurality of antennas, etc.

The RAN node 2000 may communicate with a core network (e.g., backend network, backhaul network, backbone network, Data Network, etc.) of the wireless communication network via a core network interface 2400. The core network interface 2400 may be a wired and/or wireless network interface and may enable the RAN node 2000 to communicate and/or transmit data to and from to network devices on the backend network, such as a core network gateway (not shown), a Data Network (not shown), such as the Internet, intranets, wide area networks, telephone networks, VoIP networks, etc.

While FIG. 2 depicts an example embodiment of a RAN node 2000, the RAN node is not limited thereto, and may include additional and/or alternative architectures that may be suitable for the purposes demonstrated. For example, the functionality of the RAN node 2000 may be divided among a plurality of physical, logical, and/or virtual network elements, such as a centralized unit (CU), a distributed unit (DU), and/or a radio unit (RU), etc., but the example embodiments are not limited thereto.

Figure 3:
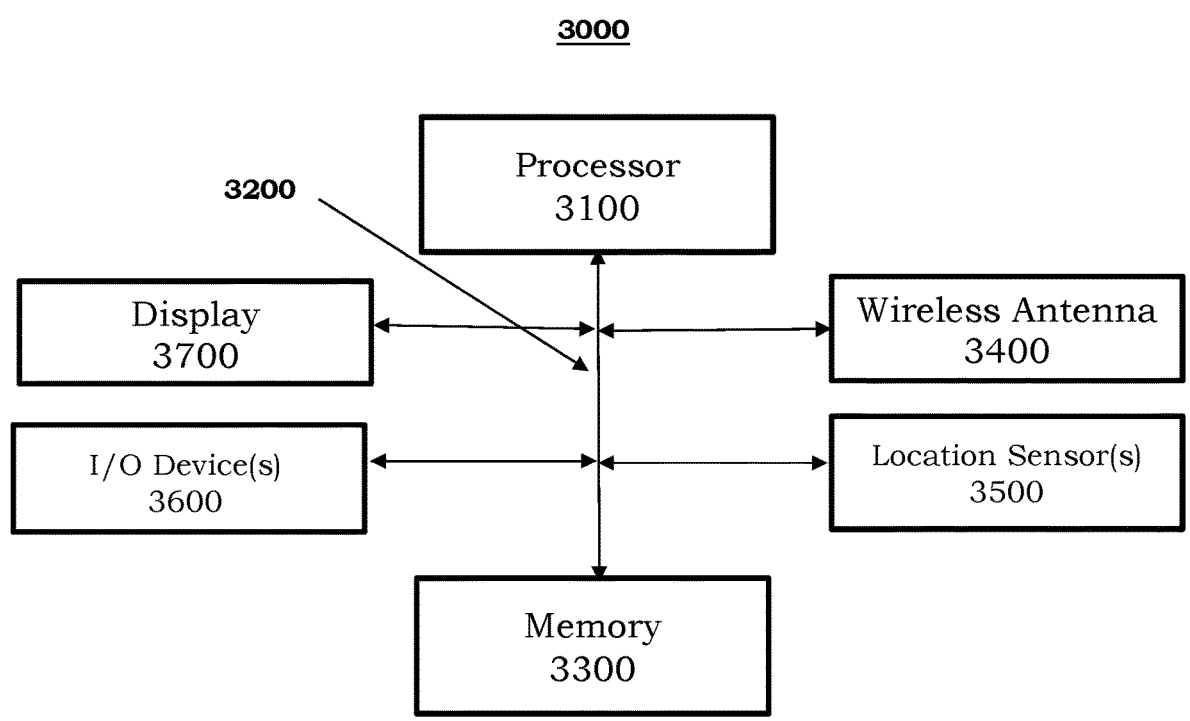
FIG. 3 illustrates a block diagram of a UE device according to at least one example embodiment.

FIG. 3 illustrates a block diagram of an example UE device according to at least one example embodiment. The example UE device 3000 of FIG. 3 may correspond to the UE device 130 of FIG. 1, but the example embodiments are not limited thereto. According to at least one example embodiment, the UE device 3000 of FIG. 3 may be a NR-Light and/or a REDCAP UE device, or a legacy UE device configured to operate using NR-Light and/or REDCAP-specific system information, but the example embodiments are not limited thereto. Additionally, for the sake of clarity and convenience, the term "REDCAP UE device" will be used to refer to REDCAP devices, NR-Light devices, and/or legacy UE devices configured to operate in accordance with the methods of one or more of the example embodiments described herein.

Referring to FIG. 3, a UE 3000 may include processing circuitry, such as the at least one processor 3100, a communication bus 3200, a memory 3300, at least one wireless antenna 3400, at least one location sensor 3500, at least one input/output (I/O) device 3600 (e.g., a keyboard, a touchscreen, a mouse, a microphone, a camera, a speaker, etc.), and/or a display panel 3700 (e.g., a monitor, a touchscreen, etc.), but the example embodiments are not limited thereto. However, the example embodiments are not limited thereto, and the UE 3000 may include a greater or lesser number of constituent components. For example, the UE 3000 may also include a battery, one or more additional sensors (e.g., thermometers, humidity sensors, pressure sensors, motion sensors, accelerometers, etc.), actuators, etc. Additionally, the location sensor 3500, the display panel 3700, and/or I/O device 3600, etc., of UE 3000 may be optional.

In at least one example embodiment, the processing circuitry may include at least one processor (and/or processor cores, distributed processors, networked processors, etc.), such as the at least one processor 3100, which may be configured to control one or more elements of the UE 3000, and thereby cause the UE 3000 to perform various operations. The processing circuitry (e.g., the at least one processor 3100, etc.) is configured to execute processes by retrieving program code (e.g., computer readable instructions) and data from the memory 3300 to process them, thereby executing special purpose control and functions of the entire UE 3000. Once the special purpose program instructions are loaded into the processing circuitry (e.g., the at least one processor 3100, etc.), the at least one processor 3100 executes the special purpose program instructions, thereby transforming the at least one processor 3100 into a special purpose processor.

In at least one example embodiment, the memory 3300 may be a non-transitory computer-readable storage medium and may include a random access memory (RAM), a read only memory (ROM), and/or a permanent mass storage device such as a disk drive, or a solid state drive. Stored in the memory 3300 is program code (i.e., computer readable instructions) related to operating the UE 3000, such as the methods discussed in connection with FIGS. 4 to 7, the wireless antenna 3400, and/or the location sensor 3500, etc. Such software elements may be loaded from a non-transitory computer-readable storage medium independent of the memory 3300, using a drive mechanism (not shown) connected to the UE 3000, or via the wireless antenna 3400, etc. Additionally, the memory 3300 may store network configuration information, such as system information, etc., for communicating with at least one RAN node, e.g., RAN node 120, etc., accessing a wireless network, but the example embodiments are not limited thereto.

For example, according to at least one example embodiment, the UE 3000 may synchronize (e.g., acquire synchronization, etc.) with a RAN node based on information included in a SSB, MIB, and/or PBCH received from the RAN node. According to at least one example embodiment, the UE 3000 may determine whether the RAN node supports REDCAP UE devices based on at least one REDCAP support information including in the MIB, such as at least one REDCAP support indicator bit in the MIB, and correspondingly receive an extended CORESET 0 (e.g., REDCAP CORESET 0, etc.) configured to support REDCAP UE devices. Additionally, according to other example embodiments, the UE 3000 may automatically assume that the RAN node supports REDCAP UE devices without reliance on the REDCAP support information in the MIB (and/or the MIB transmitted by the RAN node may omit the REDCAP support information, etc.), and may blindly search for and decode PDCCH in the extended CORESET 0. The extended CORESET 0 will be discussed in greater detail in connection with FIGS. 4 to 7.

The UE 3000 may further determine a search space 0 for detection of PDCCH associated with the extended CORESET 0 and/or information included in the MIB. For example, the UE 3000 may determine PDCCH candidates to monitor in search space 0 associated with the extended CORESET 0 and/or the MIB. The UE 3000 may then detect the PDCCH assigned to and/or associated with the UE 3000 from among the plurality of PDCCH candidates within the search space associated with the extended CORESET 0, and then may receive the DCI from the detected PDCCH. According to at least one example embodiment, the DCI may be a REDCAP-specific DCI that has been masked and/or scrambled using a REDCAP-specific radio network temporary identifier (RNTI), and includes DCI information specific to REDCAP UE devices. According to some example embodiments, the RAN node may transmit the REDCAP-specific DCI in addition to a legacy DCI. The REDCAP-specific DCI may be the same bit-length as a legacy DCI, but is not limited thereto, and for example, may be smaller than a legacy DCI, etc. Additionally, the REDCAP-specific DCI may include REDCAP UE device specific information, such as REDCAP SIB1 scheduling information, slot aggregation information for a corresponding REDCAP-specific SIB1, etc., and/or the resource allocation for the REDCAP-specific DCI may be more compact than the legacy DCI which may therefore cause the REDCAP-specific DCI format to be smaller in size than the legacy DCI format. According to at least one other example embodiment, the DCI may be a modified version of the legacy DCI (e.g., modified DCI, etc.) wherein a desired (and/or predefined) number of reserved bits of the legacy DCI (e.g., use the 15 bits which are reserved for HARQ-ACK, HARQ ID, etc., within the legacy DCI) may be used to provide scheduling information for SIB messages, such as SIB1, etc., relevant to the REDCAP UE device (e.g., RED-CAP SIB1 scheduling information, etc.). The modified DCI may have the same bit length as the legacy DCI, may be larger than the legacy DCI, etc., but the example embodiments are not limited thereto.

According to some example embodiments, the UE 3000 may further be configured to receive the REDCAP SIB1 message and/or the modified SIB1 message from the RAN node based on the SIB1 scheduling information (e.g., RED-CAP SIB1 scheduling information) included in the RED-CAP-specific DCI and/or the modified DCI, and access the wireless network based on system information included in the SIB1 message.

In at least one example embodiment, the communication bus 3200 may enable communication and data transmission to be performed between elements of the UE 3000. The bus 3200 may be implemented using a high-speed serial bus, a parallel bus, and/or any other appropriate communication technology. According to some example embodiments, the UE 3000 may include a plurality of communication buses (not shown).

The UE 3000 may also include at least one wireless antenna 3400. The wireless antenna 3400 may include an associated radio unit (not shown) and may be used to transmit wireless signals in accordance with at least one desired radio access technology, such as 4G LTE, 5G NR, a future 6G communication protocol, a future 7G communication protocol, Wi-Fi, etc. According to some example embodiments, the wireless antenna 3400 may be a single antenna, or may be a plurality of antennas, etc.

The UE 3000 may also include at least one location sensor 3500 to calculate the absolute and/or relative location of the UE 3000. The at least one location sensor 3500 may be a GNSS sensor, such as a GPS sensor, a GLONASS sensor, a Galileo sensor, a Beidou sensor, etc., an inertial movement sensors, such as a gyroscope, an accelerometer, an altimeter, etc. Additionally, the location sensor 3500 and/or the processor 3100 may also use cellular network based positioning services, such as a cellular network location service (e.g., a location management function (LMF) service of the core network), an Assisted-GPS (A-GPS) function, etc., to determine the current location of the UE 3000. However, the example embodiments are not limited thereto, and the at least one location sensor 3500 may be omitted from the UE 3000.

While FIG. 3 depicts an example embodiment of a UE 3000, the UE device is not limited thereto, and may include additional and/or alternative architectures that may be suitable for the purposes demonstrated.

Figure 4:
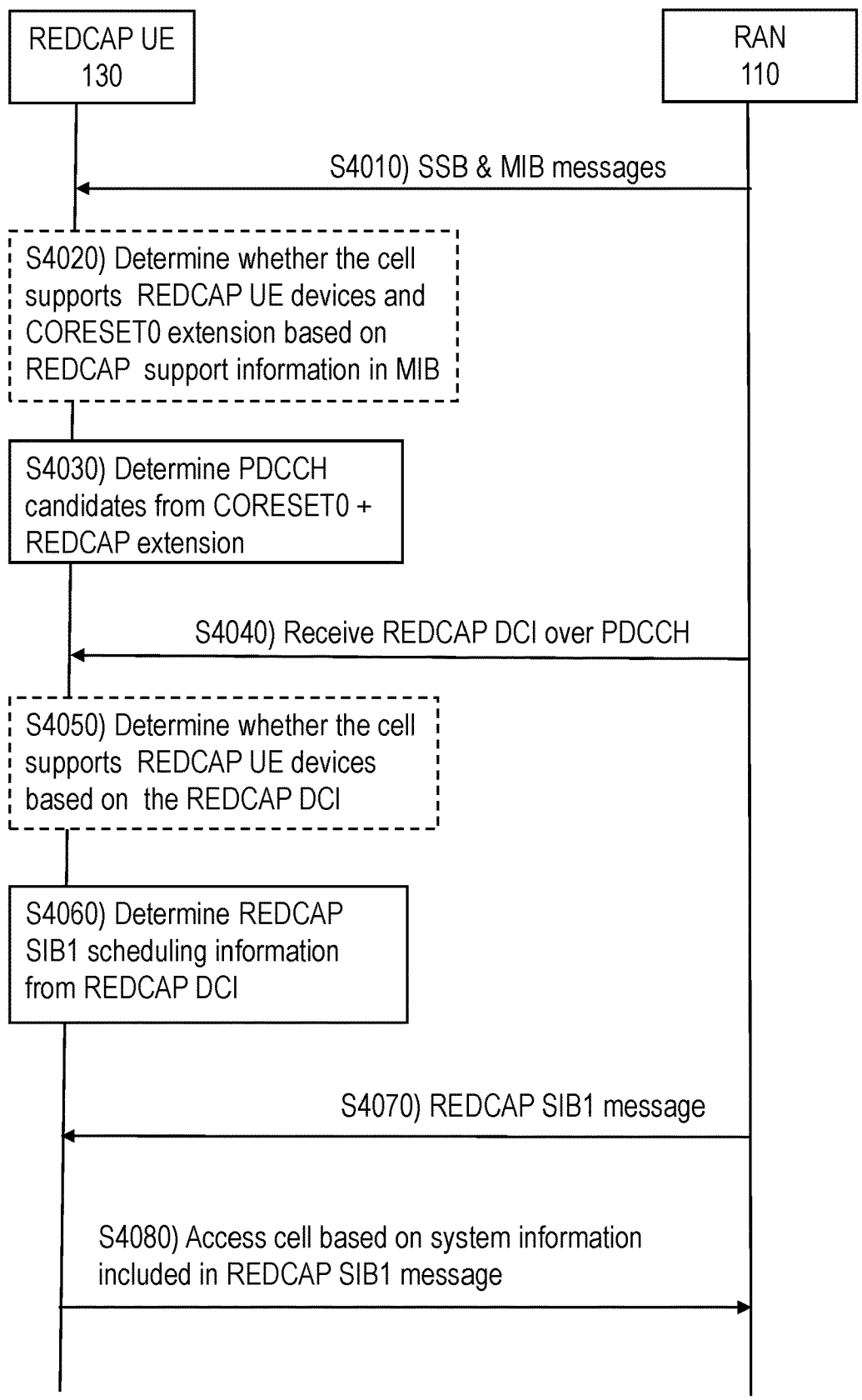
FIG. 4 illustrates an example transmission flow diagram between a UE device and one or more RAN nodes according to some example embodiments.

FIG. 4 illustrates a transmission flow diagram between at least one UE device and at least one RAN node according to some example embodiments.

Referring now to FIG. 4, in at least one example embodiment, a UE device, such as UE device 130, may be a REDCAP UE device and/or a legacy UE device is configured to operate as a REDCAP UE device, and a RAN node, such as RAN node 110, may be a RAN node which supports REDCAP SIB1 messages, but the example embodiments are not limited thereto.

In operation S4010, the RAN node 110 may broadcast and/or transmit SSB and MIB messages to the REDCAP UE 130, but is not limited thereto. The UE device 130 may then decode and/or read the received SSB and MIB messages. In at least one example embodiment, in operation S4020, the UE device 130 may determine whether the RAN node 110 supports extended CORESETs (e.g., REDCAP CORESETs, etc.) and/or REDCAP SIB1 messages based on REDCAP support information, and/or a REDCAP support indicator bit, included in the MIB, but the example embodiments are not limited thereto.

In operation S4030, the UE device 130 may determine the extended CORESET 0 (e.g., the legacy CORESET 0 and REDCAP extension to the CORESET, etc.) and an associated search space, e.g., search space 0, from the MIB and/or the results of the determining whether the RAN node 110 supports extended CORESETs and/or REDCAP SIB1 messages. For example, the UE device 130 may determine PDDCH candidates (e.g., control channel elements over which the PDDCH may be transmitted from the RAN node 110) based on the determined extended CORESET 0, etc.

Further, in operation S4030, the UE device 130 decodes the determined CORESET 0 based on the results of determining whether the RAN node 110 supports extended CORESETs and/or REDCAP SIB1 messages. More specifically, if the UE device 130 determines the RAN node 110 supports extended CORESETs and/or REDCAP SIB1 messages, the UE device 130 may use REDCAP related aggregation levels to decode the extended CORESET 0 and determine the PDCCH candidates for the REDCAP UE device. For example, the UE device 130 may use aggregation levels 4, 8, and/or 16 to decode PDCCH candidates from the legacy CORESET 0, and may use REDCAP related aggregation level 24 to decode PDCCH candidates from the REDCAP extension to the CORESET, but the example embodiments are not limited thereto. In other example embodiments, the UE device 130 may use REDCAP related aggregation levels 4, 8, and/or 24 to decode PDCCH candidates from the search space, etc. The extended CORESETs will be discussed in further detail in connection with FIGS. 5 to 7.

In at least one other example embodiment, the UE device 130 in operation S4030 may assume that the CORESET 0 is an extended CORESET by assuming that the determined CORESET 0 includes the REDCAP extension, and then may monitor (e.g., blindly search, blindly monitor, etc.) the search space 0 for the PDCCH candidates corresponding to the extended CORESET 0.

Once the extended CORESET 0 has been decoded, in operation S4040, the UE device 130 may detect the PDCCH to use with the RAN node 110 from the plurality of determined PDCCH candidates, and may receive the REDCAP-specific DCI. The REDCAP-specific DCI may be a modified DCI (e.g., modified legacy SIB1 DCI, etc.), which includes information regarding the scheduling of the new REDCAP-specific SIB1, and/or may be a new REDCAP DCI transmitted by the RAN node 110.

In optional operation S4050, after blindly searching for PDDCH candidates based on the assumption that the determined CORESET 0 was an extended CORESET 0, the UE device 130 may determine that the RAN node 110 supports extended CORESETs and/or REDCAP SIB1 based on the successful reception of the REDCAP-specific DCI from the RAN node 110 using the PDDCH candidates.

According to at least one example embodiment, in operation S4060, if the REDCAP-specific DCI is the modified DCI, the UE device 130 may determine the REDCAP SIB1 scheduling information from a desired number of bits (e.g., 15 bits, etc.) of the modified DCI. For example, the modified DCI may include the REDCAP SIB1 scheduling information in 15 (unused) bits reserved for HARQ-ACK, HARQ ID, etc., but the example embodiments are not limited thereto, and a greater or lesser number of bits of the DCI may be used. According to another example embodiment, if the REDCAP-specific DCI is a new REDCAP DCI which has been previously masked and/or scrambled using a desired REDCAP-SI-RNTI by the RAN node 110, the UE device 130 may decode the REDCAP DCI using the desired REDCAP-SI-RNTI (e.g., a REDCAP RNTI, etc.) to determine the scheduling information of the REDCAP SIB1 message.

In operation S4070, the UE device 130 may receive the REDCAP SIB1 message from the RAN node 110. The REDCAP SIB1 message may be a REDCAP-specific SIB1 (e.g., exclusively used by REDCAP UE devices) and/or a modified SIB1 which may be used by both legacy UE devices and RECAP UE devices.

In operation S4080, the UE device 130 may access (and/or initiate access to) the wireless network (e.g., the cell corresponding to the RAN node 110, etc.) based on the information (e.g., system information, network configuration information, etc.) included in the REDCAP SIB1 message or modified SIB1 message, and/or any other subsequent REDCAP SIB messages (e.g., REDCAP SIB2, SIB3, SIB4, etc., messages and/or modified SIB2, SIB3, SIB4, etc., messages, etc.). In other words, according to at least one example embodiment, the transmission of the REDCAP SIB1 message (and/or modified SIB1 message) by the RAN node 110 may cause and/or enable the UE device 130 to access or initiate access to the wireless network.

Figure 5:
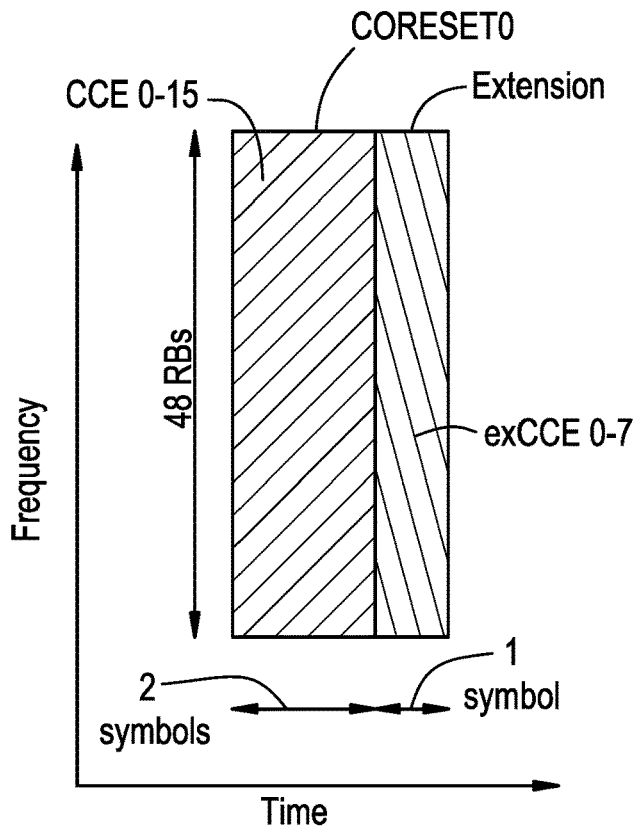
FIGS. 5 to 7 illustrate examples of extended CORESET information according to some example embodiments.
Figure 6:
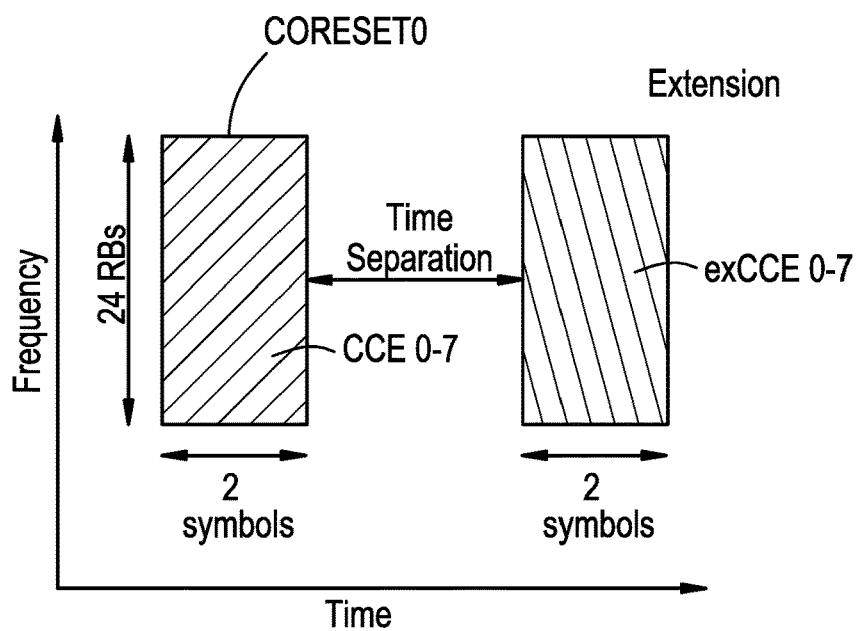
Figure 7:
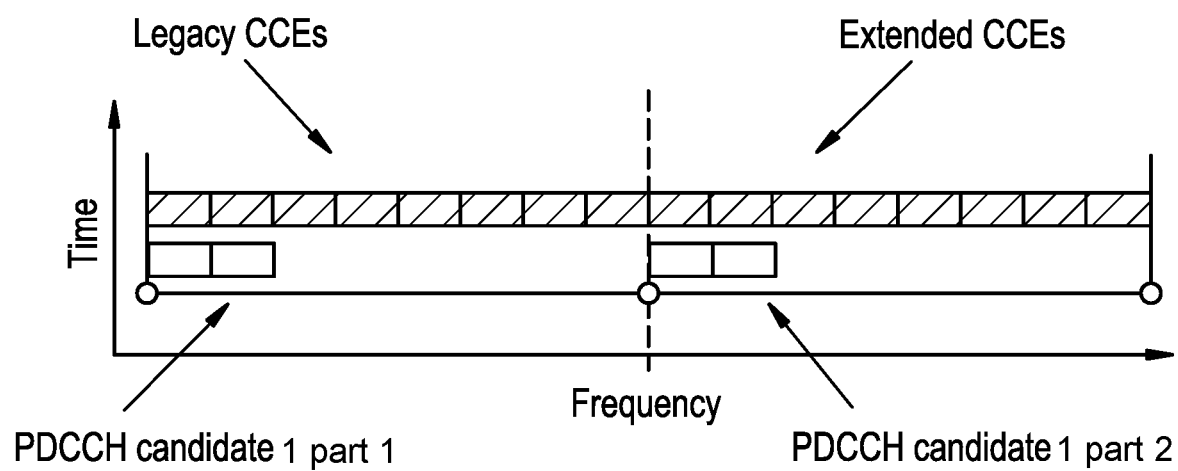

Referring now to FIGS. 5 to 7, various examples the extended CORESET 0 (e.g., a legacy CORESET 0 with a REDCAP extension) are illustrated according to some example embodiments.

In FIG. 5, according to at least one example embodiment, the extended CORESET 0 may be a legacy CORESET 0 with a REDCAP extension, but is not limited thereto. The CORESET 0 may be a set of resources including a number of control channel elements (CCEs) across the frequency (e.g., resource blocks (RBs) or physical resource blocks (PRBs)) and time domains (e.g., orthogonal frequency division multiplexing (OFDM) symbols). The CORESET 0 may be used by a UE device, such as UE device 130, to determine the PDCCH candidates of an associated search space to be monitored, and each PDCCH candidate may comprise a contiguous subset of logical CCEs of the CORESET. Each CCE in the CORESET corresponds to a desired number of resource element groups (REGs), for example 6 REGs are defined in the 5G RAT, and each REG may include a desired number of resource elements carrying PDCCH (e.g., 9 resource elements in the 5G RAT) and a desired number of resource elements carrying a demodulation reference signal (DMRS) (e.g., 3 resource elements in the 5G RAT) in a RB and OFDM symbol, but the example embodiments are not limited thereto.

According to at least one example embodiment, the extended CORESET 0 may reserve 16 CCEs (e.g., legacy CCEs, legacy control resources, legacy control resource elements, etc.) to the legacy CORESET 0 using 2 OFDM symbols and 48 RBs, and append an additional 8 CCEs (e.g., exCCEs 0-7, extended CCEs, extended control resources, extended control resource elements, REDCAP CCEs, REDCAP control resources, REDCAP control resource elements, etc.) reserved for the REDCAP extension using an extra OFDM symbol and 48 RBs, but the example embodiments are not limited thereto. The combination of the legacy CCEs and the extended CCEs may be referred to as joint control resources. The UE device 130 may determine the CCEs corresponding to the PDCCH candidates based on a desired aggregation level to use with a defined hashing function corresponding to the RAT (e.g., 5G RAT, etc.) to determine the search spaces to monitor for the PDCCH.

For example, according to the example embodiment of FIG. 5, if the UE device 130 is a legacy UE device, the UE device 130 may search the CCEs corresponding to the legacy CORESET 0 using aggregation levels 4, 8, and 16, which correspond to the legacy CORESET only. If the UE device 130 is a REDCAP UE device, the UE device 130 use the extended aggregation level 24 (e.g., a desired REDCAP aggregation level, etc.) to search the CCEs associated with the CCEs of the legacy CORESET 0 (e.g., CCEs 0-15) and the CCEs of the REDCAP extension (e.g., extended CCEs 0-7), but the example embodiments are not limited thereto. Additionally, according to some example embodiments, the UE device 130 may use all of the aggregation levels corresponding to both the legacy CORESET 0 and the REDCAP extension, e.g., aggregation levels 4, 8, 16, and 24, to determine the PDCCH candidates to monitor. Further, according to other example embodiments, the UE device 130 may determine which aggregation levels to use based on the results of determining whether the RAN node 110 supports extended CORESETs and/or REDCAP UE devices. For example, if the UE device 130 determines that the RAN node 110 supports only legacy CORESET 0, then the UE device 130 may omit the use of aggregation levels corresponding to the REDCAP extension (e.g., the REDCAP aggregation levels and/or aggregation level 24, etc.). Additionally, as discussed in connection with operation S4050 of FIG. 4, the UE device 130 may automatically assume that the CORESET 0 is an extended CORESET 0 and attempt to determine the PDCCH candidates using the legacy and REDCAP aggregation levels, and then determine whether the cell (e.g., RAN node 110) supports REDCAP UE devices based on whether the attempt to decode the PDCCH candidates was successful.

Referring now to FIG. 6, FIG. 6 illustrates a second example extended CORESET 0 according to at least one example embodiment. According to this example embodiment, the extended CORESET 0 may include a legacy CORESET 0 that comprises CCEs 0-7 across 2 OFDM symbols that are transmitted to the UE device 130 in a first time-frequency region indicated by the first CORESET configuration (e.g., a PDCCH code block, etc.), and an extension (e.g., extended CCEs 0-7) transmitted to the UE device 130 in a subsequent separate time-frequency region indicated by the second and/or extended CORESET configuration. According to this example embodiment, both the legacy CCEs and the extension CCEs may comprise 24 resource blocks across 2 OFDM symbols, and accordingly, the UE device 130 may use aggregation levels 4, 8, 24 to search both the legacy CCEs and the extended CCEs, to determine the PDCCH candidates, but the example embodiments are not limited thereto.

Referring now to FIG. 7, FIG. 7 illustrates a third example extended CORESET 0 according to at least one example embodiment. According to this example embodiment, the extended CORESET 0 may include a legacy CORESET 0, and an extension CORESET 0, which are appended to the legacy CORESET 0, but the example embodiments are not limited thereto. The UE device 130 considers the extended CORESET 0 as one CORESET (e.g., a single CORESET), and determines the CCEs and REGs based on this extended CORESET 0. According to some example embodiments, the joint control resource(s) (such as CCEs or REGs) may be interleaved and PDCCH candidates of an associated search space (e.g., search space 0, etc.) may be mapped to the joint control resources of the extended CORESET using a hash function. The PDCCH code block (e.g. coded DCI bits) may be mapped to the CCEs of a PDCCH candidate frequency at a first time and a second time based on the assumption that the extended CCEs are appended in the frequency domain, but the example embodiments are not limited thereto. Additionally, according to some example embodiments, the UE device 130 may decode the extended CORESET 0 using the aggregation levels associated with the legacy CORESET 0, e.g., aggregation levels 4, 8, and 16, and the UE device 130 does not have to use the REDCAP aggregation level associated with the extended CORESET 0, e.g., aggregation level 24, etc.

While FIGS. 4 to 7 illustrate various methods for acquiring and/or transmitting REDCAP-specific system information from a wireless network by a UE device, the example embodiments are not limited thereto, and other methods may be used to acquire REDCAP-specific system information from a wireless network by a UE device.

Various example embodiments are directed towards a wireless network system including one or more NR-Light and/or REDCAP UE devices configured to acquire REDCAP-specific system information from at least one cell of the wireless network. Accordingly, one or more of the example embodiments provide a method for acquiring system information to a wireless network for acquiring REDCAP-specific system information from a cell of the wireless network that consumes less power and/or requires reduced computation complexity than conventional system information acquisition techniques, thereby improving the battery life, increasing the efficiency and/or increasing the performance for NR-Light and/or REDCAP UE devices.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A user equipment (UE) device comprising:
a memory storing computer readable instructions; and
processing circuitry configured to execute the computer readable instructions to cause the UE device to perform the following operations:
determine whether a radio access network (RAN) node supports an extended CORESET that includes one or more of legacy control resources and one or more extended control resources, wherein determining whether the RAN node supports the extended CORESET comprises:
receiving a master information block (MIB) from the RAN node;
determining whether the MIB includes reduced capability (REDCAP) support information; and
based on results of the determining whether the MIB includes the REDCAP support information, determining the RAN node supports the extended CORESET:
use aggregation levels to decode physical downlink control channel (PDCCH) candidates from the extended CORESET and a REDCAP related aggregation level to decode PDCCH candidates from a REDCAP extension to the extended CORESET;
based on the decoded extended CORESET, determine a plurality of PDCCH candidates for the UE;
detect a PDCCH from the plurality of PDCCH candidates to use with the RAN node;
determine REDCAP scheduling information from a downlink control information (DCI) received on the PDCCH, wherein the DCI is scrambled using a REDCAP-specific radio network temporary identifier (RNTI), and the DCI includes scheduling information corresponding to REDCAP SIB1; and
receive REDCAP system information based on the determined REDCAP scheduling information.

2. The UE device of claim 1, wherein the plurality of PDCCH candidates include control channel elements (CCEs) from the one or more of legacy control resources and the one or more extended control resources.

3. The UE device of claim 2, wherein the one or more of legacy control resources and the one or more of extended control resources are contiguous in a time domain or a frequency domain.

4. The UE device of claim 3, wherein the one or more of legacy control resources and the one or more extended control resources are in different slots.

5. The UE device of claim 4, wherein the plurality of PDCCH candidates include CCEs from the extended control resources.

6. A system comprising:
a user equipment (UE);
a processor; and
a memory storing computer readable instructions that, when executed by the processor, cause the UE to perform the following operations:
determine whether a radio access network (RAN) node supports an extended CORESET that includes one or more of legacy control resources and one or more extended control resources, wherein determining whether the RAN node supports the extended CORESET comprises:
receiving a master information block (MIB) from the RAN node;
determining whether the MIB includes reduced capability (REDCAP) support information; and
based on results of the determining whether the MIB includes the REDCAP support information, determining the RAN node supports the extended CORESET;
use aggregation levels to decode physical downlink control channel (PDCCH) candidates from the extended CORESET and a REDCAP related aggregation level to decode PDCCH candidates from a REDCAP extension to the extended CORESET;
based on the decoded extended CORESET, determine a plurality of PDCCH for the UE;
detect a PDCCH from the plurality of PDCCH candidates to use with the RAN node;
determine REDCAP scheduling information from a downlink control information (DCI) received on the PDCCH, wherein the DCI is scrambled using a REDCAP-specific radio network temporary identifier (RNTI), and the DCI includes scheduling information corresponding to REDCAP SIB1; and
receive REDCAP system information based on the determined REDCAP scheduling information.

7. A method comprising:
determining, by a user equipment (UE), whether a radio access network (RAN) node supports an extended CORESET that includes one or more of legacy control resources and one or more extended control resources, wherein determining whether the RAN node supports the extended CORESET comprises:

receiving a master information block (MIB) from the RAN node;

determining whether the MIB includes reduced capability (REDCAP) support information; and based on results of the determining whether the MIB includes the REDCAP support information, determining the RAN node supports the extended CORESET;

using, by the UE, aggregation levels to decode physical downlink control channel (PDCCH) candidates from the extended CORESET and a REDCAP related aggregation level to decode PDCCH candidates from a REDCAP extension to the extended CORESET;

based on the decoded extended CORESET, determine, by the UE, a plurality of PDCCH for the UE;

detecting, by the UE, a PDCCH from the plurality of PDCCH candidates to use with the RAN node;

determining, by the UE, REDCAP scheduling information from a downlink control information (DCI) received on the PDCCH, wherein the DCI is scrambled using a REDCAP-specific radio network temporary identifier (RNTI), and the DCI includes scheduling information corresponding to REDCAP SIB1; and receiving, by the UE, REDCAP system information based on the determined REDCAP scheduling information.

\* \* \* \* \*